(12) United States Patent
Yadin et al.

(10) Patent No.: US 10,288,904 B2
(45) Date of Patent: May 14, 2019

(54) LENSES WITH ELECTRICALLY-TUNABLE POWER AND ALIGNMENT

(71) Applicant: Optica Amuka (A.A.) Ltd., Petach Tikva (IL)

(72) Inventors: Yoav Yadin, Ganei Tikva (IL); Alex Alon, Binyamina (IL); Yariv Haddad, Ra'anana (IL)

(73) Assignee: Optica Amuka (A.A.) Ltd., Petach Tikva (IL)

( * ) Notice: Subject to any disclaimer, the term of this patent is extended or adjusted under 35 U.S.C. 154(b) by 0 days.

(21) Appl. No.: 16/001,954

(22) Filed: Jun. 7, 2018

(65) Prior Publication Data

US 2018/0292678 A1   Oct. 11, 2018

Related U.S. Application Data

(63) Continuation of application No. 14/428,426, filed as application No. PCT/IB2013/058989 on Sep. 30, 2013, now Pat. No. 10,036,901.

(Continued)

(51) Int. Cl.
*G02C 7/08*   (2006.01)
*G02C 7/12*   (2006.01)
(Continued)

(52) U.S. Cl.
CPC ............. *G02C 7/083* (2013.01); *G02C 7/12* (2013.01); *G02F 1/0121* (2013.01);
(Continued)

(58) Field of Classification Search
CPC ...... G02C 7/083; G02C 7/12; G02C 2202/20; G02F 1/134336; G02F 1/29; G02F 2001/291; G02F 2203/28
(Continued)

(56) References Cited

U.S. PATENT DOCUMENTS 3,881,921 A   5/1975 Frank
4,584,592 A   4/1986 Tuan et al.
(Continued)

FOREIGN PATENT DOCUMENTS

CN   201752480 U   3/2011
EP   2682810 A1   1/2014
(Continued)

OTHER PUBLICATIONS

JP Application # 2016-555831 office action dated Oct. 30, 2018.
(Continued)

*Primary Examiner* — Collin X Beatty
*Assistant Examiner* — Grant A Gagnon
(74) *Attorney, Agent, or Firm* — Kligler & Associates

(57) ABSTRACT

An optical device includes an electro-optical layer, having an effective local index of refraction at any given location within an active area of the electro-optical layer that is determined by a voltage waveform applied across the electro-optical layer at the location. An array of excitation electrodes, including parallel conductive stripes extending over the active area is disposed over one or both sides of the electro-optical layer. Control circuitry is coupled to apply respective control voltage waveforms to the excitation electrodes and is configured to concurrently modify the respective control voltage waveforms applied to excitation electrodes so as to generate a specified phase modulation profile in the electro-optical layer.

26 Claims, 4 Drawing Sheets

Related U.S. Application Data

(60) Provisional application No. 61/707,962, filed on Sep. 30, 2012.

(51) Int. Cl.
  *G02F 1/29* (2006.01)
  *G02F 1/1343* (2006.01)
  *G02F 1/01* (2006.01)

(52) U.S. Cl.
  CPC .......... *G02F 1/134336* (2013.01); *G02F 1/29* (2013.01); *G02C 2202/20* (2013.01); *G02F 2001/291* (2013.01); *G02F 2203/28* (2013.01)

(58) Field of Classification Search
  USPC ......................................................... 351/159
  See application file for complete search history.

(56) References Cited

U.S. PATENT DOCUMENTS

| | | | |
|---|---|---|---|
| 6,517,203 | B1 | 2/2003 | Blum et al. |
| 7,475,984 | B2 | 1/2009 | Blum et al. |
| 8,675,148 | B2 | 3/2014 | Takagi et al. |
| 8,773,629 | B2 | 7/2014 | Uehara et al. |
| 9,052,514 | B2 | 6/2015 | Takama |
| 9,241,669 | B2 | 1/2016 | Pugh et al. |
| 9,304,319 | B2 | 4/2016 | Bar-Zeev et al. |
| 9,541,774 | B2 | 1/2017 | Machida et al. |
| 2005/0168430 | A1 | 8/2005 | Nishimura et al. |
| 2009/0237575 | A1 | 9/2009 | Tsi-Shi |
| 2010/0026920 | A1 | 2/2010 | Kim et al. |
| 2011/0018903 | A1 | 1/2011 | Lapstun et al. |
| 2012/0147038 | A1 | 6/2012 | Perez et al. |
| 2012/0194781 | A1 | 8/2012 | Agurok |
| 2013/0250193 | A1 | 9/2013 | Yun et al. |
| 2014/0036183 | A1 | 2/2014 | Asatryan et al. |
| 2015/0185503 | A1 | 7/2015 | Tate et al. |
| 2015/0219893 | A1 | 8/2015 | Chen et al. |
| 2017/0160518 | A1 | 6/2017 | Lanman et al. |
| 2017/0184848 | A1 | 6/2017 | Vallius |

FOREIGN PATENT DOCUMENTS

| | | |
|---|---|---|
| JP | 2003091013 A | 3/2003 |
| JP | 2011203457 A | 10/2011 |

OTHER PUBLICATIONS

US Appl. No. 15/310,798 office action dated Oct. 4, 2018.
JP Application # 2016-569044 office action dated Oct. 3, 2018.
International Application # PCT/IB2018/054957 Search Report dated Nov. 28, 2018.
International Application # PCT/IB2018/057841 search report dated Jan. 15, 2019.
EP Application # 18213190.4 search report dated Feb. 14, 2019.
EP Application # 15761611.1 office action dated Feb. 13, 2019.
Indian Application #1664/CHENP/2015 Office Action dated Jan 29, 2019.

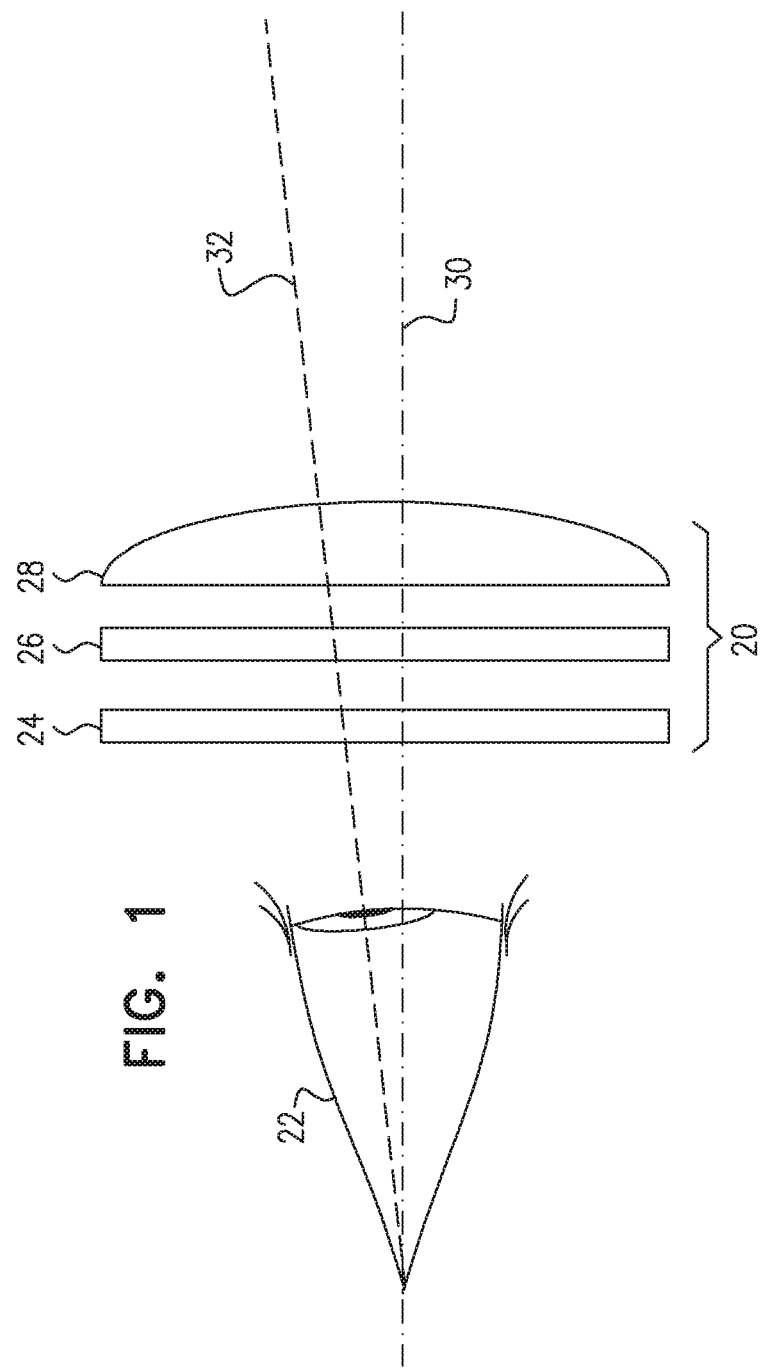

LENSES WITH ELECTRICALLY-TUNABLE POWER AND ALIGNMENT

CROSS-REFERENCE TO RELATED APPLICATIONS

This application is a continuation of U.S. patent application Ser. No. 14/428,426, filed Mar. 16, 2015, in the national phase of PCT Patent Application PCT/IB2013/058989, filed Sep. 30, 2013, which claims the benefit of U.S. Provisional Patent Application 61/707,962, filed Sep. 30, 2012, which is incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications. For example, U.S. Pat. No. 7,475,985, whose disclosure is incorporated herein by reference, describes the use of an electro-active lens for the purpose of vision correction.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Various designs for lenses based on liquid crystals are known in the art, although their practical uses have been limited. For example, Naumov et al. describe one approach for this purpose in "Liquid-Crystal Adaptive Lenses with Modal Control," Optics Letters 23, pages 992-994 (1998), which is incorporated herein by reference. The authors used nematic liquid-crystal (LC) phase correctors to form spherical and cylindrical wave fronts. A LC cell with a distributed reactive electrical impedance was driven by an AC voltage applied to the cell boundary to yield the desired spatial distribution of the refractive index.

Other tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

SUMMARY

Embodiments of the present invention that are described hereinbelow provide improved electronically-tunable optical devices.

There is therefore provided, in accordance with an embodiment of the present invention, an optical device, including an electro-optical layer, having a local effective index of refraction at any given location within an active area of the electro-optical layer that is determined by a voltage waveform applied across the electro-optical layer at the location. A common electrode is positioned over the active area on a first side of the electro-optical layer. An array of excitation electrodes, including parallel conductive stripes, extends over the active area on a second side of the electro-optical layer, opposite the first side. Control circuitry is coupled to apply respective control voltage waveforms to the excitation electrodes and is configured to concurrently modify the respective control voltage waveforms applied to a plurality of the excitation electrodes, thereby modifying a phase modulation profile of the electro-optical layer.

In some embodiments, the control circuitry is configured to apply the control voltage waveforms to the excitation electrodes so that the device functions as a cylindrical lens, possible a cylindrical Fresnel lens, having focal properties determined by the phase modulation profile. Typically, the control circuitry is configured to modify the control voltage waveforms applied to the excitation electrodes so as to change a focal length of the cylindrical lens and/or to shift a focal line of the cylindrical lens in a direction transverse to the device.

In disclosed embodiments, the electro-optical layer includes a liquid crystal, which may be configured as a polarization-independent layer.

There is also provided, in accordance with an embodiment of the present invention, apparatus including first and second optical devices as described above, wherein the first and second optical devices are arranged in series. The electrodes of the first and second optical devices may share a common substrate. In a disclosed embodiment, the excitation electrodes in the second optical device are oriented in a direction orthogonal to the excitation electrodes in the first optical device, and the control circuitry may be configured to apply the control voltages to the excitation electrodes in the first and second optical devices so that the apparatus emulates a spherical lens. Optionally, the control circuitry may modify the control voltages applied to the excitation electrodes so as to shift an optical axis of the spherical lens.

Alternatively, the electro-optical layer in the first optical device has a first birefringence axis, and the electro-optical layer in the second optical device has a second birefringence axis, perpendicular to the first birefringence axis.

There is additionally provided, in accordance with an embodiment of the present invention, an ophthalmic lens system including the device as described above.

There is further provided, in accordance with an embodiment of the present invention, an optical device, including an electro-optical layer, having an effective local index of refraction at any given location within an active area of the electro-optical layer that is determined by a voltage waveform applied across the electro-optical layer at the location. A first array of first excitation electrodes, including first parallel conductive stripes, extends in a first direction over the active area on a first side of the electro-optical layer. A second array of second excitation electrodes, including second parallel conductive stripes, extends in a second direction, orthogonal to the first direction, over the active area on a second side of the electro-optical layer, opposite the first side. Control circuitry is coupled to apply respective control voltage waveforms to the excitation electrodes and is configured to concurrently modify the respective control voltage waveforms applied to both the first excitation electrodes and the second excitation electrodes so as to generate a specified phase modulation profile in the electro-optical layer.

In disclosed embodiments, the control circuitry is configured to apply the control voltage waveforms at different, respective amplitudes to different ones of the excitation electrodes and/or with different, respective duty cycles to different ones of the excitation electrodes.

In some embodiments, the control circuitry is configured to apply the control voltage waveforms to the excitation electrodes so that the device functions as a lens, such as a Fresnel lens, having focal properties determined by the phase modulation profile. Typically, the control circuitry is configured to modify the control voltage waveforms applied to the excitation electrodes so as to change a focal length of the lens and/or to shift an optical axis of the lens. The control circuitry may apply the voltage waveforms to the excitation electrodes so that the device functions as an astigmatic spherical lens.

In one embodiment, the control circuitry is configured to apply the control voltage waveforms so that the voltage applied across the electro-optical layer is constrained to be within a range in which the local effective index of refraction varies as a quasi-linear function of the applied voltage.

In another embodiment, the phase modulation profile is defined as a function that is separable into first and second component functions, which respectively vary along first and second axes aligned in the second and first directions, respectively, and the control voltage waveforms applied to the first and second excitation electrodes are specified in accordance with the first and second component functions, respectively. The first and second component functions may be defined in terms of a set of component waveforms that are selected so as to correspond to different, respective phase shifts in the electro-optical layer, such that the phase modulation profile includes a sum of the respective phase shifts due to the first and second component functions at each location within the active area.

There is moreover provided, in accordance with an embodiment of the present invention, apparatus including first and second optical devices as described above, wherein the first and second optical devices are arranged in series, possibly with perpendicular birefringence axes.

There is furthermore provided, in accordance with an embodiment of the present invention, an optical device, including an electro-optical layer, having a local effective index of refraction at any given location within an active area of the electro-optical layer that is determined by a voltage applied across the electro-optical layer at the location. The electro-optical layer has first and second sides and a layer thickness equal to a distance between the first and second sides. Conductive electrodes extend over the first and second sides of the electro-optical layer. The electrodes include at least one array of excitation electrodes having an inter-electrode pitch that is less than four times the layer thickness of the electro-optical layer. Control circuitry is coupled to apply control voltage waveforms to the excitation electrodes so as to modify a phase modulation profile of the electro-optical layer.

In a disclosed embodiment, the electrodes include parallel stripes of a transparent conductive material having gaps between the stripes of a gap width that is less than the layer thickness of the electro-optical layer.

There is also provided, in accordance with an embodiment of the present invention, a method for producing an optical device. The method includes providing an electro-optical layer, having a local effective index of refraction at any given location within an active area of the electro-optical layer that is determined by a voltage waveform applied across the electro-optical layer at the location. A common electrode is positioned on a first side of the electro-optical layer, so as to cover the active area. An array of excitation electrodes, including parallel conductive stripes, is positioned so as to extend over the active area on a second side of the electro-optical layer, opposite the first side. Control circuitry is coupled to apply respective control voltage waveforms to the excitation electrodes and to concurrently modify the control voltage waveforms applied to a plurality of the excitation electrodes, thereby modifying a phase modulation profile of the electro-optical layer.

There is additionally provided, in accordance with an embodiment of the present invention, a method for producing an optical device, which includes providing an electro-optical layer, having a local effective index of refraction at any given location within an active area of the electro-optical layer that is determined by a voltage waveform applied across the electro-optical layer at the location. A first array of first excitation electrodes, including first parallel conductive stripes, is positioned so as to extend in a first direction over the active area on a first side of the electro-optical layer. A second array of second excitation electrodes, including second parallel conductive stripes, is positioned so as to extend in a second direction, orthogonal to the first direction, over the active area on a second side of the electro-optical layer, opposite the first side. Control circuitry is coupled to apply respective control voltage waveforms to the excitation electrodes and to concurrently modify the control voltage waveforms applied to both the first excitation electrodes and the second excitation electrodes so as to generate a specified phase modulation profile in the electro-optical layer.

There is further provided, in accordance with an embodiment of the present invention, a method for producing an optical device. The method includes providing an electro-optical layer, having a local effective index of refraction at any given location within an active area of the electro-optical layer that is determined by a voltage applied across the electro-optical layer at the location, the electro-optical layer having first and second sides and a layer thickness equal to a distance between the first and second sides. Conductive electrodes are positioned so as to extend over the first and second sides of the electro-optical layer, the electrodes including at least one array of excitation electrodes having an inter-electrode pitch that is less than four times the layer thickness of the electro-optical layer. Control circuitry is coupled to apply control voltage waveforms to the excitation electrodes so as to modify a phase modulation profile of the electro-optical layer.

The present invention will be more fully understood from the following detailed description of the embodiments thereof, taken together with the drawings in which:

BRIEF DESCRIPTION OF THE DRAWINGS

FIG. 1 is schematic side view of an optical system, in accordance with an embodiment of the present invention;

DETAILED DESCRIPTION OF EMBODIMENTS

Overview

Figure 2A:
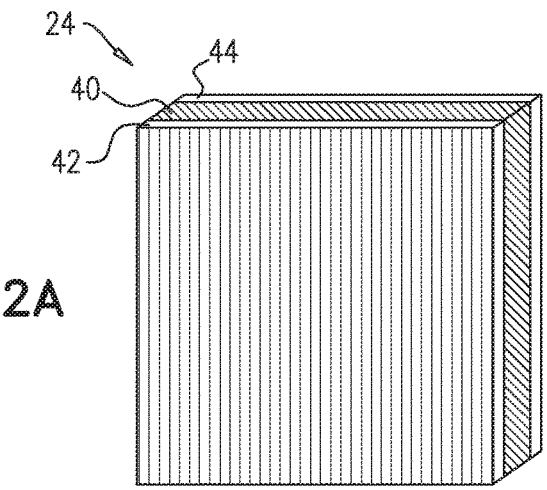
FIG. 2A is a schematic, pictorial illustration of an optical device, in accordance with an embodiment of the present invention.

Electrically-tunable lenses using an electro-optical material with a pixel grid can, in principle, generate any desired phase modulation profile, within the limits of the achievable range of the local refractive index and the pitch of the pixels. Realization of practical lenses for many applications, however, such as for ophthalmic use, requires a large addressable grid of very small pixels, for example, an array of at least 400×400 pixels with a pitch of 50 µm or less.

In liquid-crystal display (LCD) panels, the pixels are typically arranged in a matrix of N rows and M columns. Each of the N*M pixels can receive a set of possible values (gray levels), independent of all other pixels. Different pixel values are obtained by altering the local voltages applied to the liquid crystal (LC) layer. Typically the voltage is time-varying and alternating in sign (AC), at a rate faster than the LC response time, and the LC responds to the effective average applied voltage, as long as the average voltage is above a certain threshold.

The effective voltages applied to the LCD panel pixels are controlled by driving circuitry. Due to the large pixel count, the driving circuitry typically controls the voltages of column and row electrodes and does not directly control the voltage on each pixel. This scheme enables the driver to control only N+M, instead of N*M, voltage values. Since it is necessary to control the effective voltage on each pixel independently, time-sharing techniques are used in the driver to update the values of the pixels serially. Row electrodes are typically used for control voltages, selecting an active row, while column electrodes are used to apply data-dependent voltages, corresponding to the required values of the pixels in the currently-active row that is selected by the row control voltage. The required pixel values of a certain column are thus multiplexed over the column voltage waveforms.

Time-sharing of this sort can be achieved, for example, by placing a transistor beside every pixel. The transistor connects the column electrode to the pixel electrode, and its conductivity is controlled by the corresponding row electrode. Rows are thus addressed serially, one row at a time. When a certain row, for example row number k, is to be updated, the voltage of the k row electrode is set to open the transistors of the pixels of that row, while all other row voltages are set to close the transistors. The column electrode voltages are then updated according to the data to be displayed in row k. Although panels of this sort are capable of implementing a lens, the relatively low pixel fill factor, due to the transistors, produces diffractive effects that limit the lens quality.

Time-sharing can also be implemented without resorting to transistors. In this scheme, known as time-division multiplexing, the LC layer is positioned between two arrays of parallel electrodes, oriented orthogonally. The X-axis electrodes are positioned on one side of the LC, and the Y-axis electrodes, orthogonal to the X-axis electrodes, are positioned on the other side of the LC. The voltage on each pixel is thus the difference between the voltage waveforms of its row and column electrodes. In order to achieve the desired phase modulation profile, the voltages of all row electrodes except for the row that is to be updated are set to a value Vbias, which is chosen to ensure that the voltage difference between Vbias and the column electrode voltages is below the LC response threshold voltage. Only the pixels in the row that is to be updated receive voltages that are larger than the LC threshold voltage, and are thus updated.

This scheme, however, cannot support large pixel counts, and therefore cannot be used to implement a high quality lens.

Embodiments of the present invention that are described herein overcome the above limitations by providing novel electrically-tunable optical devices that are able to achieve finer pitch and more flexible addressability than devices that are known in the art. For example, the disclosed devices may be configured to operate as cylindrical lenses (with focusing along one axis, using an array of stripe electrodes) or to emulate spherical lenses, with dual-axis focusing. Both the focal power and the location of the optical axis, i.e., the effective central point or axis of the lens defined in this manner, can be changed freely and rapidly by application of appropriate control voltages.

Generally speaking, the disclosed devices can be configured to apply any phase modulation profile that is separable. A two dimensional phase modulation profile $e^{i\Theta(x,y)}$ is separable if it can be decomposed into a product of two one-dimensional functions, $e^{i\Theta(x,y)}=e^{i\Theta_x(x)} \cdot e^{i\Theta_y(y)}$. In other words, these devices are able to apply any phase modulation profile that is defined as a function that is separable into two component functions that vary along respective, mutually-orthogonal axes, and the phase modulation profile will then comprise a sum of the respective phase shifts due to the first and second component functions. (As phase is a cyclical function, with period $2\pi$, the term "sum" should be understood in this context as including modular summation, with modulo $2\pi$.)

In some of the disclosed embodiments, an optical device comprises an electro-optical layer, meaning, as explained above, that the local effective index of refraction at any given location within the active area of the layer is determined by the voltage applied across the layer in the vicinity of the location. Typically, the electro-optical layer comprises a liquid crystal, possibly a polarization-independent liquid crystal layer (such as a cholesteric LC layer), although other types of electro-optical materials may alternatively be used. A common electrode is positioned over the active area on one side of the electro-optical layer. An array of excitation electrodes, comprising parallel stripes of a conductive material, extends over the active area on the opposite side of the electro-optical layer.

To drive and modify the phase modulation profile of the electro-optical layer, control circuitry applies respective control voltages to the excitation electrodes. Typically, each stripe (i.e., each excitation electrode) is individually connected to and controlled by the control circuitry, so that the voltage waveforms applied to several or even all of the excitation electrodes can be modified concurrently. This configuration provides an optical element of arbitrary, tunable one-dimensional profile (such as a cylindrical lens), with a resolution limited only by the distance between the stripes and the thickness of the electro-optical layer. The phase modulation properties of the device can be modified at a rate limited only by the speed of the control circuitry and the response time of the electro-optical layer.

Two devices of this type may be superimposed at right angles, with the excitation electrodes in one device oriented in a direction orthogonal to those in the other device, in order to provide apparatus capable of emulating a spherical lens under the paraxial approximation.

In other embodiments, an optical device comprises an electro-optical layer with first and second arrays of excitation electrodes on opposite sides of the layer. Each of the arrays comprises parallel stripes of a conductive material extending over the active area, with the second array oriented in a direction orthogonal to the first array. Control circuitry applies respective control voltage waveforms to the excitation electrodes in both arrays and is capable of modifying the control voltages applied to multiple excitation electrodes (and possibly all of the excitation electrodes) on both of the sides of the electro-optical layer. The control circuitry may concurrently modify the respective control voltage waveforms applied to the excitation electrodes in both the first and second arrays so as to generate a specified phase modulation profile in the electro-optical layer.

In these embodiments, no time-division multiplexing scheme is required, and both row and column voltage waveforms are data-dependent. The voltage waveforms are chosen to create a linear phase response in the electro-optical material. Formally stated, the term "linear phase response," used in connection with voltage waveforms applied to the LC, means that when a set of voltages waveforms $\{V_{X,i}(t)\}_{i=1}^{N}$ is applied to a first set of electrodes, corresponding to a first predefined set of phase values $\{\emptyset_{X,i}\}_{i=1}^{N}$, and a set of voltage waveforms $\{V_{Y,j}(t)\}_{j=1}^{M}$ is applied to a second set of electrodes, positioned orthogonally to the first set of electrodes, corresponding to a second predefined set of phase values $\{\emptyset_{Y,j}\}_{j=1}^{M}$ then for each $i=1 \ldots N$ and $j=1 \ldots M$, the phase modulation profile $T_{LC}\{V(t)\}$ for light passing through the electro-optical layer when the voltage waveform $V(t)$ is applied to it will be $T_{LC}\{V_{X,i}(t)-V_{Y,j}(t)\}=e^{i(\emptyset_{X,i}+\emptyset_{Y,j})}$. In practical embodiments, the inventors have found that sets of sixteen or more phase values (i.e., N, M>16) give good results in terms of optical performance.

For example, a spherical lens is an optical element with a transfer function $$T(x, y) = e^{i\frac{\pi}{\lambda f}(x^2+y^2)},$$

f and λ being the lens focal length and the wavelength respectively. T(x, y) is separable, $$T(x, y) = e^{i\frac{\pi}{\lambda f}x^2} \cdot e^{i\frac{\pi}{\lambda f}y^2},$$

and the total phase response can be expressed as a sum of a phase contribution in the x axis and a phase contribution in the y axis. The maximal phase retardation of a lens with an aperture radius R is $$\frac{\pi}{\lambda f}R^2.$$

The phase modulation range can be divided into N quantization levels, $$\emptyset_i = \frac{i}{N} \cdot \frac{\pi}{\lambda f}R^2.$$

In some embodiments of the present invention, linear-phase-response voltage waveforms are defined to correspond to these phase values. The required phase modulation value is then calculated for each electrode. For example, the electrode positioned at $x=x_1$ requires a phase $$\frac{\pi}{\lambda f}(x_1 - x_o)^2,$$

wherein $x_o$ is the center point of the lens. This phase value is quantized to the closest predefined quantization level. Denoting the closest quantization level by $$\emptyset_l = \frac{l}{N} \cdot \frac{\pi}{\lambda f}R^2 \cong \frac{\pi}{\lambda f}(x_1 - x_o)^2,$$

the voltage waveform applied to the electrode at $x=x_1$ will be $V_{X,i}(t)$. By appropriate selection of the linear-phase-response voltage waveforms, the phase modulation at each pixel will be the sum of the phase modulations corresponding to the electrode voltage waveforms on the X- and Y-axes, thus forming a lens.

Thus, in distinction to LCD panels known in the art, both the X- and Y-axis electrodes are driven with data-dependent voltage waveforms, and all electrodes can be driven concurrently and independently. The term "concurrently," as used in this context, means that the driving waveforms are applied to multiple pixels, in different rows and columns of the array defined by the electrodes, at the same time, without time-division multiplexing. The term "independently" means that a different, data-dependent waveform may be applied to each electrode, along both X- and Y-axes. The control circuitry may apply the respective voltages to different ones of the electrodes at different amplitudes and/or with temporal waveforms, typically having different duty cycles.

In LCD devices that are known in the art, the pitch of the pixels is large compared to the thickness of the liquid-crystal layer, in order to keep the pixels distinct from their neighbors and minimize crosstalk. The distance between adjoining electrodes is likewise large relative to the liquid-crystal layer thickness. By contrast, in some embodiments of the present invention, the inter-electrode pitch (which may be constant or variable) is less than four times the layer thickness of the electro-optical layer, or possibly less than twice the layer thickness or even less than the layer thickness itself. The distance between electrode stripes may likewise be less than layer thickness of the electro-optical layer. The small electrode pitch and narrow gap between electrodes enhance the desired fine resolution of the tunable optical device. Furthermore, the crosstalk between adjacent pixels that results from this fine electrode geometry can actually be beneficial in smoothing the phase profile that is generated over the area of the optical device.

System Description

FIG. 1 is schematic side view of an optical system 20, in accordance with an embodiment of the present invention. In the pictured embodiment, system 20 is configured to function as an ophthalmic lens, which provides dynamic correction for the vision of an eye 22 of a user. This embodiment is just one non-limiting example, however, of possible applications of the principles of the present invention.

Figure 2B:
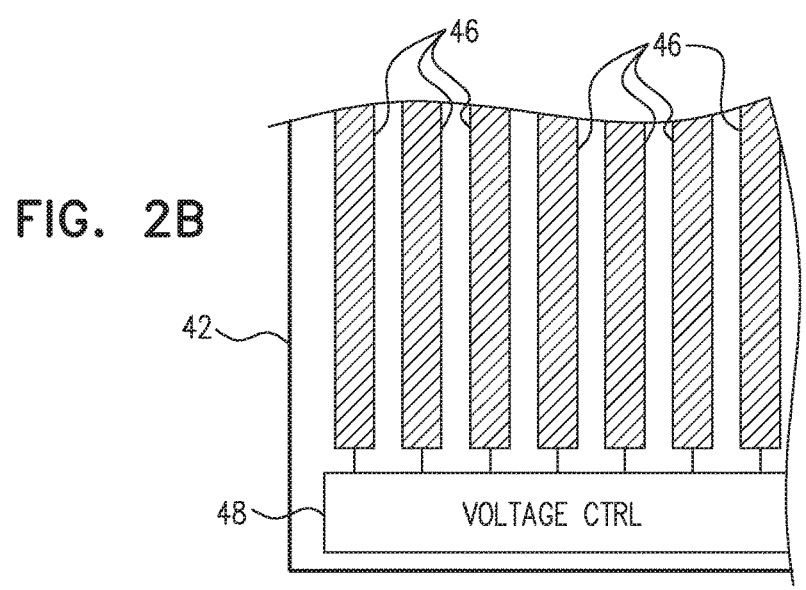
FIGS. 2B and 2C are schematic side views of electrodes disposed on opposing sides of the device of FIG. 2A, in accordance with an embodiment of the present invention.
Figure 2C:
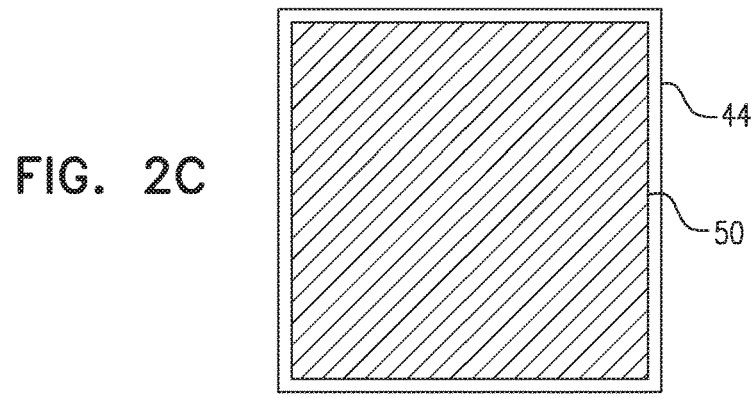

System 20 comprises two electrically-tunable optical devices 24 and 26, which are arranged in series and are configured to function as adjustable cylindrical lenses. A device of this sort is illustrated in FIGS. 2A-2C. By virtue of the orientation of excitation electrodes in devices 24 and 26, the respective cylinder axes of the two devices are mutually perpendicular, such that device 24, for example, has a vertical focal line, while device 26 has a horizontal focal line. Although devices 24 and 26 are shown, for the sake of clarity, as separate units, the two devices may optionally share a common substrate.

As a further option, which is illustrated in FIG. 1, devices 24 and 26 may be used in conjunction with a conventional lens 28. This lens provides the baseline refractive power of system 20, which is dynamically adjusted by operation of devices 24 and 26.

A control unit (not shown) controls optical devices 24 and 26 so as to tune their respective optical powers and alignment. For example, the respective optical powers may be increased or decreased to accommodate the distance at which eye 22 is attempting to focus. Devices 24 and 26 may be set to have the same optical power, in order to emulate a spherical lens, possibly with the addition of aspheric components. Alternatively, devices 24 and 26 may have different optical powers in order to function as an astigmatic lens.

As another example, which is illustrated in FIG. 1, the optical center lines of devices 24 and 26 may be shifted transversely, so that the optical axis of system 20 shifts from a baseline axis 30 to a deviated axis 32. This sort of axis shift can be applied, possibly in conjunction with tracking of the eye, to dynamically align the optical axis of the system with the user's gaze angle.

More generally speaking, system 20 can be controlled, by application of appropriate control voltages to devices 24 and 26, to implement substantially any desired phase profile that is separable into horizontal and vertical components, as long as the range of phase shifts in the profile is achievable by the range of refractive index variation and the thickness of the electro-optical layers in devices 24 and 26. To reduce the required range of phase shifts, the voltages applied to devices 24 and 26 may be chosen so that the devices operate as cylindrical Fresnel lenses.

In other embodiments, cylindrical devices 24 and 26 may be replaced by a single optical device with electrodes arranged to generate a two-dimensional phase profile. Such a device is described below with reference to FIGS. 3A-D.

Tunable Cylindrical Lens

Reference is now made to FIGS. 2A-C, which schematically show details of optical device 24, in accordance with an embodiment of the present invention. FIG. 2A is a pictorial illustration of the device, while FIGS. 2B and 2C are side views of opposing sides of the device. In system 20 (FIG. 1), device 26 may be of identical design to device 24, but with excitation electrodes 46 oriented horizontally, rather than vertically as illustrated in FIG. 2B.

Device 24 comprises an electro-optical layer 40, such as a liquid-crystal layer, which is typically contained by suitable encapsulation, as is known in the art. Layer 40 has a local effective index of refraction at any given location within its active area (for example, within the area of layer 40 that actually contains the liquid crystal) that is determined by the voltage applied across the layer at that location. The liquid crystal in layer 40 may be birefringent, in which case device 24 or system 20 may comprise a polarizer, as is known in the art (omitted from the figures for simplicity), in order to select the polarization of the light that is to be passed and refracted by layer 40. Alternatively, to avoid the need for a polarizer, two such lenses can be concatenated with perpendicular axes of birefringence, so that each operates on a different, orthogonal polarization, or a polarization-independent liquid crystal layer, such as a layer of cholesteric liquid crystal material, may be used.

Transparent substrates 42 and 44, such as glass blanks, are positioned on opposing sides of layer 40, and respective electrodes are disposed on the substrates as shown in FIGS. 2B and 2C. The electrodes comprise a transparent, conductive material, such as indium tin oxide (ITO), as is known in the art. Alternatively, non-transparent electrodes may be used, as long as they are thin enough so that they do not cause disturbing optical effects. A common electrode 50 on substrate 44 is positioned over the active area of layer 40 on one side. Although this common electrode is shown as a monolithic rectangle, it may alternatively have any suitable shape that sufficiently covers the active area of layer 40. An array of excitation electrodes 46, comprising parallel stripes of the transparent conductive material on substrate 42, extends over the active area on the opposite side of layer 40. ("Parallel" in this context may include, as well, electrodes that deviate in angle by several degrees.)

For example, the electrode patterns shown in the figures may be formed by lithography on substrates 42 and 44, after which the substrates are glued together at a predefined distance, typically a few microns, by using glues or etched spacers as are known in the art. Layer 40 is then inserted and sealed in the gap between the substrates. Although for the sake of visual clarity, only a few electrodes 46 are shown in FIG. 2C, in practice, for good optical quality, device 24 will typically comprise at least 100 stripe electrodes for excitation, and possibly even 400 or more. This same proviso applies to the stripe electrodes shown in FIGS. 3B and 3C.

Control circuitry 48 is coupled to apply respective control voltages to excitation electrodes 46, relative to the common voltage level of electrode 50. Control circuitry 48 typically comprises amplifiers and/or switches, as are known in the art, which control either the amplitude or the duty cycle, or both, of the voltage that is applied to each electrode 46. The pattern of amplitudes and/or duty cycles applied to the electrodes determines the phase modulation profile of layer 40. The circuit components in circuitry 48 are typically fabricated as a silicon chip, which is then glued onto substrate 42, as shown in FIG. 2B. Alternatively, some or all of the components of circuitry 48 may be formed on a separate chip and connected to substrate 42 by suitable bonding wires or other connections. In either case, the control circuitry can be located at the side of the array of electrodes, as shown in FIG. 3C, and there is no need for any parts of the control circuitry to be located over the active area of layer 40.

Circuitry 48 is able to modify the control voltages applied to each of a set of the excitation electrodes 46 (which may include all of the electrodes) concurrently and independently. For example, circuitry 48 may update the control voltages applied to all the odd electrodes in the array alternately with all the even electrodes. This sort of approach scales readily to large electrode counts, and can thus be used to create electrically-tunable optical systems with high pixel counts and fine resolution.

As noted earlier, device 24 may be controlled in this manner to function as a cylindrical lens, with focal properties determined by the phase modulation profile induced in layer 40 by the voltages applied to electrodes 46. Optionally, these voltages may be set so that device 24 functions as a cylindrical Fresnel lens. The control voltages applied to excitation electrodes 46 may be modified so as to change the focal length of the cylindrical lens, as well as to shift the focal line of the cylindrical lens in a direction transverse to the device (i.e., in a direction parallel to the surface of substrates 42 and 44).

Devices with Two-Dimensional Phase Modulation Profiles

Figure 3A:
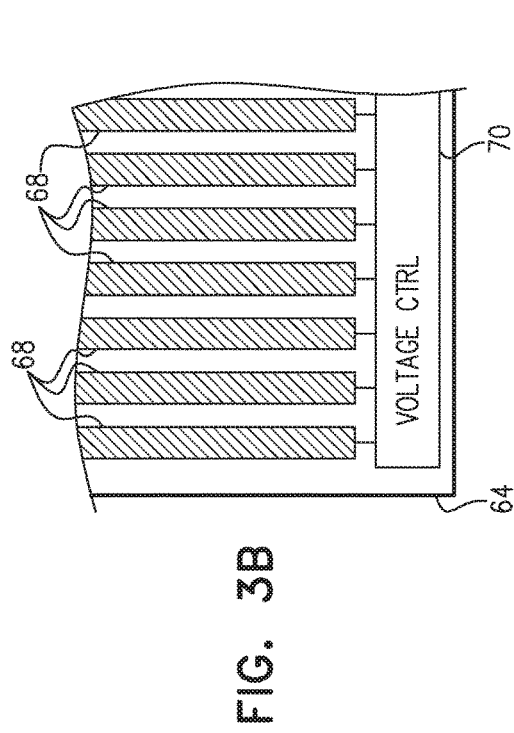
FIG. 3A is a schematic, pictorial illustration of an optical device, in accordance with another embodiment of the present invention.
Figure 3B:
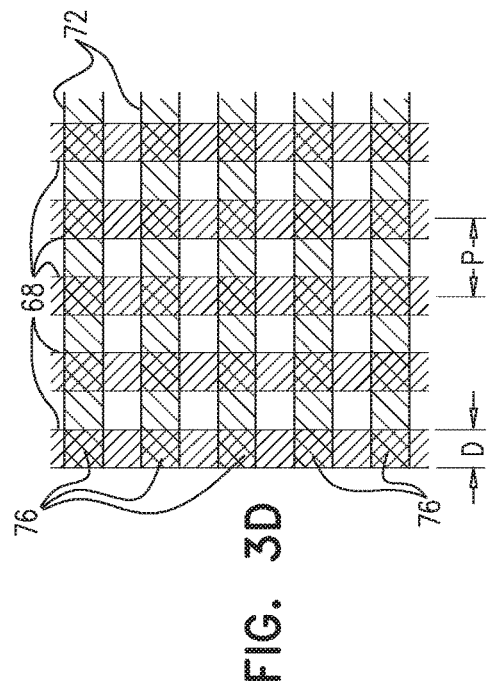
FIGS. 3B and 3C are schematic side views of electrodes formed on opposing sides of the device of FIG. 3A, in accordance with an embodiment of the present invention.
Figure 3C:
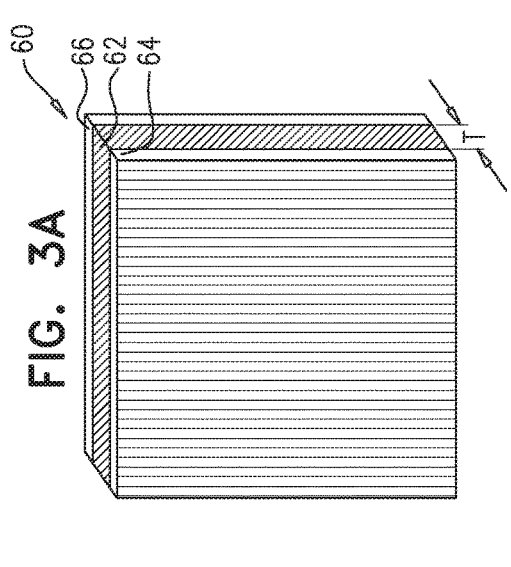
Figure 3D:
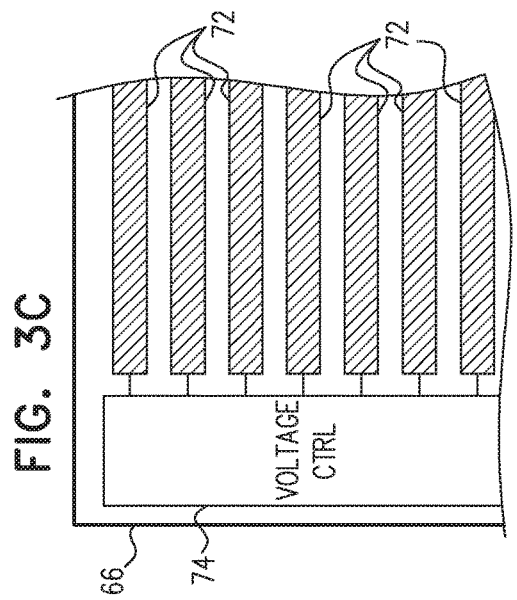
FIG. 3D is a schematic side view of the device of FIG. 3A, showing a superposition of the electrodes on the opposing sides of the device, in accordance with an embodiment of the present invention.

FIGS. 3A-3D schematically illustrate an optical device 60 in which a two-dimensional phase modulation profile is created in a single electro-optical layer 62, in accordance with another embodiment of the present invention. FIG. 3A is a pictorial illustration of device 60, while FIGS. 3B and 3C are side views showing transparent substrates 64 and 66 on opposing sides of the device. FIG. 3D is a side view of device 60, showing a superposition of excitation electrodes 68 and 72 that are located on substrates 64 and 66 on the opposing sides of the device. Device 60 may be substituted into system 20 (FIG. 1), for example, in place of the combination of devices 24 and 26.

Device 60 contains an electro-optical layer 62, such as a liquid-crystal layer, similar to layer 40, as described above. Electrodes 68 and 72 on substrates 64 and 66, respectively, comprise parallel stripes of transparent conductive material extending over the active area of layer 62 in mutually-orthogonal directions. Although electrodes 68 and 72 are of uniform shape and spacing in the figures, the stripes may alternatively have varying sizes and/or pitch.

Control circuitry 70 and 74, which may be of similar construction and design to circuitry 48 (FIG. 2B), applies control voltages to excitation electrodes 68 and 72, respectively. As in device 24, the control circuitry in device 60 is able to modify the control voltages applied to each of a set of the excitation electrodes (which may include all of the electrodes) simultaneously and independently. Control circuitry 70 and 74 together, however, can modify the voltages applied to sets of the excitation electrodes on both of the sides of layer 62, thereby modifying the phase modulation profile of the layer in two dimensions.

Control voltages may thus be applied to excitation electrodes 68 and 72 so that device 60 functions as a lens (possibly a Fresnel lens), having focal properties determined by the phase modulation profile. The control voltage waveforms result in a linear phase response of the electro-optical layer, as defined and explained above. The control circuitry can modify the control voltages so as to change the focal length and/or to shift the optical axis of the lens. The voltage patterns applied by circuitry 70 and 74 across electrodes 68 and 72 may be chosen so as to give a phase modulation profile that is circularly symmetrical, and may thus emulate a spherical lens. Alternatively, different voltage patterns may be applied so that device 60 functions, for example, as an astigmatic lens, with a stronger cylindrical component along one axis or the other.

As shown in FIG. 3D, the superposition of electrodes 68 and 72 creates an array of pixels 76, defined by the areas of overlap of the vertical stripes of electrodes 68 with the horizontal stripes of electrodes 72. The center-to-center distance between the stripes defines the pitch P of the pixel array, while the width D of the conductive stripes themselves defines the size of pixels 76. (Although these parameters are illustrated here with respect to the two-dimensional array of device 60, similar dimensions and considerations apply to the one-dimensional arrays of devices 24 and 26, described above.) These dimensional parameters of the electrode array are compared to the layer thickness T of electro-optical layer 62, shown in FIG. 3A.

In contrast to most liquid-crystal devices that are known in the art, the inter-electrode pitch P of device 60 is less than four times the thickness T of layer 62, and may be less than twice the thickness. Additionally or alternatively, the distance between the electrode stripes (P-D) may be less than the layer thickness T or possibly even less than one half of T. In some implementations, even the pitch P may be less than T. This choice of dimensions permits a high fill factor of pixels 76, and thus high resolution. Furthermore, the relatively thick layer 62 enables device 60 to generate a large range of different phase shifts, while the small pitch supports modulation of the refractive index, and hence the phase shift, with high resolution. The crosstalk between adjacent pixels that results from this choice of dimensions may actually be beneficial in smoothing the phase modulation profile of the device, and thus more closely approximating the quadratic profile of a conventional lens.

As noted earlier, device 60, as well as the combination of devices 24 and 26 in system 20, can be used particularly to generate phase modulation profiles that are separable in the X- and Y-directions. The variation of the effective refractive index of a liquid crystal or other electro-optical layer, however, is generally not linear in the applied voltage. In system 20, each of devices 24 and 26 is controlled independently, so that the voltage applied to electrodes 46 by control circuitry 48 can be compensated to adjust for the nonlinearity. In device 60, on the other hand, the voltage across each pixel 76 is a function of the voltages applied to both the vertical electrode 68 and the horizontal electrode 72 that cross at the pixel, so that compensation for nonlinearity is not straightforward.

In embodiments of the present invention, at least two different approaches may be used to achieve the desired linear phase response, and thus implement phase modulation profiles that are separable in the X- and Y-directions. One such approach is to limit the range of applied voltages, as described below with reference to FIG. 4. Alternatively, the voltage waveforms applied to electrodes 68 and 72 may be chosen so that their superposition gives a linear response in layer 62.

Figure 4:
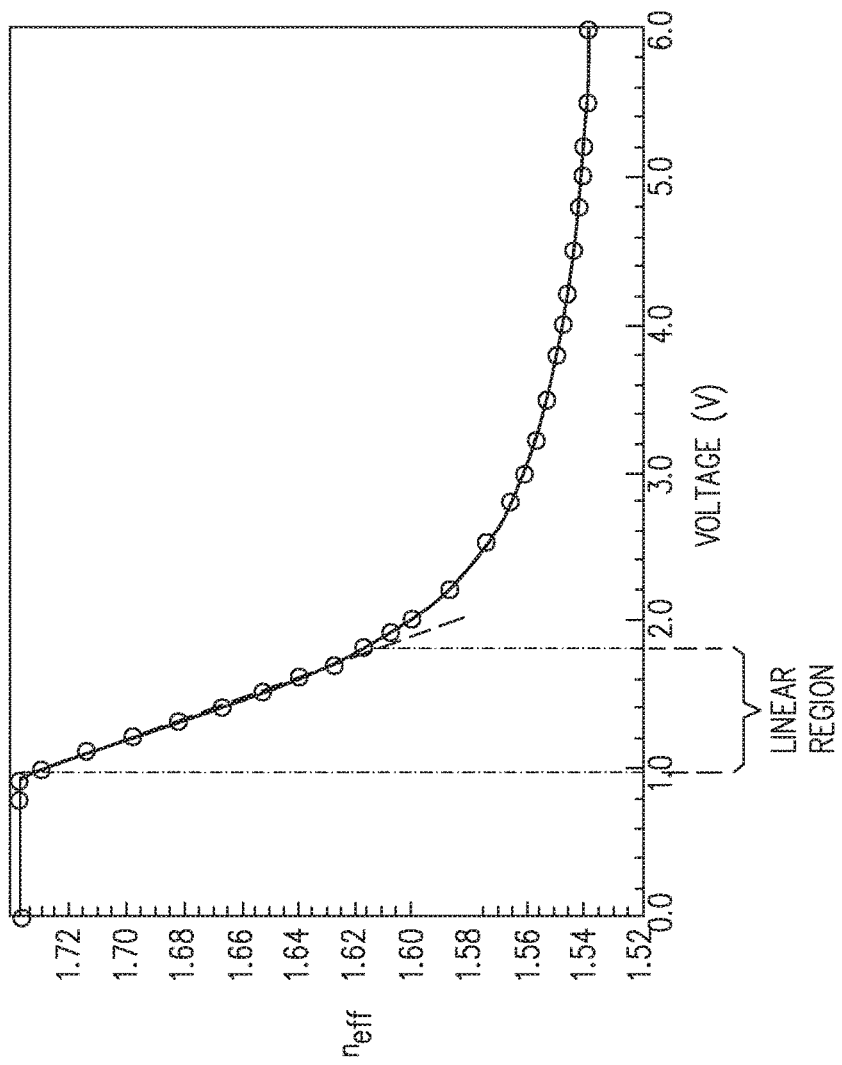
FIG. 4 is a schematic plot showing the dependence of the effective refractive index of a liquid crystal layer in an optical device as a function of applied voltage, used in controlling an optical device in accordance with an embodiment of the present invention.

FIG. 4 is a schematic plot showing the dependence of the effective refractive index n of a liquid crystal layer in an optical device on the applied voltage V that is used in controlling device 60, in accordance with an embodiment of the present invention. (This plot is based on data presented by Wang et al., in "Liquid Crystal Blazed Grating Beam Deflector," *Applied Optics* 39, pages 6545-6555 (2000).) Although the curve shown is on the whole nonlinear, it has a roughly linear region in the approximate range of 1-2 V, referred to herein as a quasi-linear region. The term "quasi-linear" is used in the present description and in the claims to refer to a region in which the effective refractive index is approximately linear in the voltage, i.e., n(V)=a+bV to within a predefined error bound, such as to within ±10%, wherein a and b are constant offset and slope parameters, respectively.

When voltages that form a cylindrical lens profile $V_x(x)$ are applied to vertical electrodes 68 (n(x)=a+b$V_x$(x) produces a cylindrical phase profile), and a similar but inverted profile $V_y(y)=-V_x(y)$ is applied to horizontal electrodes 72, the voltage profile across layer 62 is $V(x,y)=V_x(x)-V_y(y)$. This voltage profile gives a refractive index profile:

$$n(x,y)=a+b[V_x(x)-V_y(y)]=a+bV_x(x)-bV_y(y),$$

so long as the voltages are in the linear (or quasi-linear) response region. The first term (a) on the right-hand side of the equation is constant and therefore does not contribute to phase modulation. The second and third terms are the horizontal and vertical cylindrical lens components, which together make up a two-dimensional lens.

Within the quasi-linear response region of layer 62, different phase modulation values at different pixels 76 can be obtained by either applying different voltages, or applying the same voltages for different duty cycles, or a combination of both techniques, as long as the refractive index response is quasi-linear so that the equation n(x,y)=a+b$V_x$(x)-b$V_y$(y) holds.

On the other hand, although limiting the applied voltages to the quasi-linear range of electro-optical layer 62 simplifies the operation of device 60, this limitation is not essential. Even when operating outside the quasi-linear range, the phase modulation of layer 62 can be expressed as the sum of the modulations applied over the X-axis and the Y-axis. In this case, control circuitry 70 and 74 may apply the control voltages to electrodes 68 and 72 as respective waveforms, having respective temporal variation patterns chosen to generate a set of specified phase shifts in layer 62. If N different phase levels are required for a Fresnel lens, for example, then pairs of N different voltage waveforms for the X- and Y-directions electrodes are chosen in order to give the desired levels of phase response. Formally, voltage waveforms are defined for the X- and Y-direction electrodes, $Vx_i(t)$ and $Vy_i(t)$, i=0 . . . N-1, such that for each i,j=0 . . . N-1, the phase response of layer 62 to the voltage difference between the electrodes is $$\Phi\{Vx_i(t) - Vy_j(t)\} = \emptyset_0 + (i + j)\frac{2\pi}{N},$$

wherein t represents time, and $\emptyset_0$ is the baseline phase.

The choice of appropriate waveforms permits any desired separable phase profile to be realized (within the limitations of the electro-optical layer). A method for generating these voltage waveforms is presented below in an Appendix. In the approach described in the Appendix, duty-cycle modulation is applied to the electrodes at a certain, fixed voltage, but the waveforms are chosen so that during certain (typically short) time periods, the voltage across the electro-optical layer is doubled due to overlap of the X- and Y-direction waveforms. The voltage effects are averaged by the liquid crystal, but not linearly, i.e., a voltage V for a period of 2T is not equivalent to a voltage of 2V for a period T. The latter will have larger effect. This added degree of freedom is used to solve the problem and choose appropriate waveforms to achieve the desired linear response.

It will be apparent based on this derivation, however, that this particular choice of waveforms is just one example of a possible implementation of this sort of embodiment. Other sets of waveforms may similarly be derived and are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix—Constructing Voltage Waveforms for Phase Response of Electro-Optic Layer Problem Statement Define voltage waveforms for X-direction and Y-direction electrodes $\{V_{X,i}(t)\}_{i=0}^{N-1}$ and $\{V_{Y,i}(t)\}_{i=0}^{N-1}$, such that for each k,l=0 . . . N-1, the LC phase response to the voltage difference between the X- and Y-direction electrodes is $$T_{LC}\{V_{X,k}(t) - V_{Y,l}(t)\} = e^{i(\emptyset_0 + (k+l)\frac{2\pi}{N})}.$$

Definitions

The following voltage waveform functions are defined for $-T/4 < t < T/4$. The rest of the function can be completed assuming the voltage functions are periodic and alternating in sign: V(t+T/2)=-V(t).

A step function with support between $t_1$ and $t_2$ is defined by:

$$S_{t_1,t_2}(V_0, t) = \begin{cases} V_0 & t_1 < t < t_2 \\ 0 & \text{otherwise} \end{cases}, \text{wherein } D = \frac{t_2 - t_1}{T/2}$$

is the duty cycle of $S_{t_1,t_2}(V_0, t)$. The LC response depends on the duty cycle, and not on $t_1$ and $t_2$ separately.

A phase of a typical LC response to a step function, $R(t_2-t_1, V_0)=T_{LC}\{S_{t_1,t_2}(V_0, t)\}$, is:
1. Monotonically non-decreasing as a function of $V_0$, and also concave as a function of $V_0$.
2. Monotonically non-decreasing as a function of D, and also concave as a function of D.

By subtracting two step functions we can get a waveform that equals $2V_0$, $V_0$, and 0 for different time regions. For example, for $t_1 < t_2 < t_3$:

$$S_{t_1,t_3}(V_0, t) - S_{t_1,t_2}(-V_0, t) = \begin{cases} 2V_0 & t_1 < t < t_2 \\ V_0 & t_2 < t < t_3 \\ 0 & \text{otherwise} \end{cases}.$$

This waveform has a duty cycle of $$D_1 = \frac{t_2 - t_1}{T/2}$$

at voltage $2V_0$, and $$D_2 = \frac{t_3 - t_2}{T/2}$$

at voltage $V_0$. The LC response depends on the duty cycles $D_1$ and $D_2$, and not on $t_1$, $t_2$ and $t_3$ separately.

Constructing the Required Waveforms

Assumption: for each i, $V_{X,i}(t) = -V_{Y,i}(-t)$.
Step 0: Defining $V_{X,0}(t)$:
Step 0.0: The Combination $k=0$, $l=0$
  a. Find $p_0$ for which $R(p_0, V_0) = e^{i\emptyset_0}$.
  b. Define $$t_0 = \frac{p_0}{2}$$

$$V_{X,0}(t) = S_{0,t_0}(V_0, t).$$

Thus, $V_{Y,0}(t) = S_{-t_0,0}(-V_0, t)$,
$V_{X,0}(t) - V_{Y,0}(t) = S_{-t_0,t_0}(V_0, t)$, and the response to $V_{X,0}(t) - V_{Y,0}(t)$, which is a step function of length $p_0$, is $R(p_0, V_0) = e^{i\emptyset_0}$. Thus these waveforms solve the problem statement for $k=l=0$.
Step 1: Defining $V_{X,1}(t)$:
Step 1.0: The Combination $k=1$, $l=0$ (and Also $k=0$, $l=1$)
  a. Find $p_1$ for which $$R(p_1, V_0) = e^{i\left(\emptyset_0 + \frac{2\pi}{N}\right)}$$

b. Define $t_1 = p_1 - t_0$
     $V_{X,1}(t) = S_{0,t_1}(V_0, t)$
Thus, the response to $V_{X,1}(t) - V_{Y,0}(t)$, which is a step function of length $$t_1 + t_0 = p_1, \text{ is } R(p_1, V_0) = e^{i\left(\emptyset_0 + \frac{2\pi}{N}\right)},$$

and these waveforms solve the problem statement for $k=1$ and $l=0$ (and also $k=0$ and $l=1$).
Step 1.1: The Combination $k=1$, $l=1$
  The requirement is:

$$T_{LC}\{V_{X,1}(t) - V_{Y,1}(t)\} = e^{i\left(\emptyset_0 + 2\frac{2\pi}{N}\right)}$$

a. Calculate the phase response $\emptyset$ of $T_{LC}\{V_{X,1}(t) - V_{Y,1}(t)\}$, for $V_{X,1}(t)$ as defined in step 1.0.
  b. If it is close enough (within the required tolerance) to the required value $$\left(\emptyset \cong \emptyset_0 + 2\frac{2\pi}{N}\right),$$

do nothing.

c. If $\emptyset$ is not close enough to the required value, then $$\emptyset < \emptyset_0 + 2\frac{2\pi}{N}$$

(due to the concave nature of R). In this case the pulse of length $t_1$ is split into two pulses of lengths $t_1-x$, and x respectively, in the form:
$V_{X,1}(t) = S_{0,t_1-x}(V_0, t) + S_{-t_0-x,-t_0}(V_0, t)$.
This form of waveform ensures that:
  a. The supports of $V_{X,1}(t)$ and $V_{Y,0}(t)$ are disjoint, and thus LC response to the combination $k=1$ and $l=0$ does not change, since $V_{X,1}(t) - V_{Y,0}(t)$ still equals $V_0$ for a period of $p_1$, and 0 otherwise.
  b. $V_{X,1}(t) - V_{Y,1}(t)$ equals $2V_0$ for a period of 2x. Since the LC response to a voltage of $2V_0$ is stronger than the response to a voltage of $V_0$, increasing x will also increase the phase response, and a value x can be found for which $$T_{LC}\{V_{X,1}(t) - V_{Y,1}(t)\} = e^{i\left(\emptyset_0 + 2\frac{2\pi}{N}\right)}.$$

Step n: Defining $V_{X,n}(t)$:
Step n.0: the combination $k=n$, $l=0$ (and also $k=0$, $l=n$)
  a. Find n for which $$R(p_n, V_0) = e^{i\left(\emptyset_0 + n\frac{2\pi}{N}\right)}$$

b. Define $t_n = p_n - t_0$
     $V_{X,n}(t) = S_{0,t_n}(V_0, t)$
Thus, the response to $V_{X,n}(t) - V_{Y,0}(t)$, which is a step function of length $$t_n + t_0 = p_n, \text{ is } R(p_n, V_0) = e^{i\left(\emptyset_0 + n\frac{2\pi}{N}\right)},$$

and these waveforms solve the problem statement for $k=n$ and $l=0$ (and also $k=0$ and $l=n$).
Steps n.m, $m=1$ to n: The Combinations $k=n$ and $l=m$:
  The requirement is:

$$T_{LC}\{V_{X,n}(t) - V_{Y,m}(t)\} = e^{i\left(\emptyset_0 + (n+m)\frac{2\pi}{N}\right)}$$

a. Calculate the phase response $\emptyset$ of $T_{LC}\{V_{X,n}(t) - V_{Y,m}(t)\}$
  b. If it is close enough (within the required tolerance) to the required value $$\left(\emptyset \cong \emptyset_0 + (n+m)\frac{2\pi}{N}\right),$$

do nothing.
c. If $\emptyset$ is not close enough to the required value, then $$\emptyset < \emptyset_0 + (n+m)\frac{2\pi}{N}$$

(due to the concave nature of R). In this case the pulse of $V_{X,n}(t)$ is split: A period of x is deducted from the range $[t_{n-1}, t_n]$, and added to the range $[-t_{1,m}, -t_{1,m-1}]$.

This ensures that:
a. The LC response to the combinations k=n and l=0 ... m−1 does not change.
b. The LC response to the combinations k=n and l=m increases due to the added region where $V_{X,n}(t)-V_{Y,m}(t)=2 V_0$. Increasing x will increase the phase response, and a value x can be found for which $$T_{LC}\{V_{X,n}(t) - V_{Y,m}(t)\} = e^{i(\phi_0 + (n+m)\frac{2\pi}{N})}.$$

The invention claimed is:

1. An optical device, comprising:
an electro-optical layer, having an effective local index of refraction at any given location within an active area of the electro-optical layer that is determined by a voltage waveform applied across the electro-optical layer at the location;
a first array of first excitation electrodes, comprising first parallel conductive stripes extending in a first direction over the active area on a first side of the electro-optical layer;
a second array of second excitation electrodes, comprising second parallel conductive stripes extending in a second direction, orthogonal to the first direction, over the active area on a second side of the electro-optical layer, opposite the first side; and
control circuitry, which is coupled to apply respective control voltage waveforms to the excitation electrodes and is configured to concurrently modify the respective control voltage waveforms applied to both the first excitation electrodes and the second excitation electrodes so as to generate a specified phase modulation profile in the electro-optical layer.

2. The device according to claim 1, wherein the control circuitry is configured to apply the control voltage waveforms at different, respective amplitudes to different ones of the excitation electrodes.

3. The device according to claim 1, wherein the control circuitry is configured to apply the control voltage waveforms with different, respective duty cycles to different ones of the excitation electrodes.

4. The device according to claim 1, wherein the control circuitry is configured to apply the control voltage waveforms so that the voltage applied across the electro-optical layer is constrained to be within a range in which the local effective index of refraction varies as a quasi-linear function of the applied voltage.

5. The device according to claim 1, wherein the electro-optical layer has a layer thickness equal to a distance between the first and second sides, and the excitation electrodes have an inter-electrode pitch that is less than four times the layer thickness of the electro-optical layer.

6. The device according to claim 1, wherein the control circuitry is configured to apply the control voltage waveforms to the excitation electrodes so that the device functions as a lens, having focal properties determined by the phase modulation profile.

7. The device according to claim 6, wherein the control circuitry is configured to apply the control voltage waveforms to the excitation electrodes so that the device functions as a Fresnel lens.

8. The device according to claim 6, wherein the control circuitry is configured to modify the control voltage waveforms applied to the excitation electrodes so as to change a focal length of the lens.

9. The device according to claim 6, wherein the control circuitry is configured to modify the control voltage waveforms applied to the excitation electrodes so as to shift an optical axis of the lens.

10. The device according to claim 6, wherein the control circuitry is configured to apply the voltage waveforms to the excitation electrodes so that the device functions as an astigmatic spherical lens.

11. The device according to claim 1, wherein the electro-optical layer comprises a liquid crystal.

12. The device according to claim 11, wherein the liquid crystal is configured as a polarization-independent layer.

13. The device according to claim 1, wherein the phase modulation profile is defined as a function that is separable into first and second component functions, which respectively vary along first and second axes aligned in the second and first directions, respectively, and wherein the control voltage waveforms applied to the first and second excitation electrodes are specified in accordance with the first and second component functions, respectively.

14. The device according to claim 13, wherein the first and second component functions are defined in terms of a set of component waveforms that are selected so as to correspond to different, respective phase shifts in the electro-optical layer, such that the phase modulation profile comprises a sum of the respective phase shifts due to the first and second component functions at each location within the active area.

15. Apparatus comprising first and second optical devices according to claim 1, wherein the first and second optical devices are arranged in series.

16. The apparatus according to claim 15, wherein the electro-optical layer in the first optical device has a first birefringence axis, and the electro-optical layer in the second optical device has a second birefringence axis, perpendicular to the first birefringence axis.

17. An optical device, comprising:
an electro-optical layer, having a local effective index of refraction at any given location within an active area of the electro-optical layer that is determined by a voltage applied across the electro-optical layer at the location, the electro-optical layer having first and second sides and a layer thickness equal to a distance between the first and second sides;
conductive electrodes extending over the first and second sides of the electro-optical layer, the electrodes comprising at least one array of excitation electrodes comprising parallel stripes of a transparent conductive material having an inter-electrode pitch that is less than four times the layer thickness of the electro-optical layer; and
control circuitry, which is coupled to apply control voltage waveforms to the excitation electrodes so as to modify a phase modulation profile of the electro-optical layer.

18. The device according to claim 17, wherein the electrodes have gaps between the stripes of a gap width that is less than the layer thickness of the electro-optical layer.

19. The device according to claim 17, wherein the electrodes comprise first parallel conductive stripes extending in a first direction over the active area on the first side of the electro-optical layer and second parallel conductive stripes extending in a second direction, orthogonal to the first direction, over the active area on the second side of the electro-optical layer.

20. The device according to claim 17, wherein the control circuitry is configured to apply the control voltage waveforms to the electrodes so that the device functions as a lens, having focal properties determined by the phase modulation profile.

21. The device according to claim 17, wherein the electro-optical layer comprises a liquid crystal.

22. The device according to claim 21, wherein the liquid crystal is configured as a polarization-independent layer.

23. A method for producing an optical device, the method comprising:

providing an electro-optical layer, having a local effective index of refraction at any given location within an active area of the electro-optical layer that is determined by a voltage waveform applied across the electro-optical layer at the location;

positioning a first array of first excitation electrodes, comprising first parallel conductive stripes, so as to extend in a first direction over the active area on a first side of the electro-optical layer;

positioning a second array of second excitation electrodes, comprising second parallel conductive stripes, so as to extend in a second direction, orthogonal to the first direction, over the active area on a second side of the electro-optical layer, opposite the first side; and coupling control circuitry to apply respective control voltage waveforms to the excitation electrodes and to concurrently modify the control voltage waveforms applied to both the first excitation electrodes and the second excitation electrodes so as to generate a specified phase modulation profile in the electro-optical layer.

24. The method according to claim 23, wherein coupling the control circuitry comprises applying the control voltage waveforms at different, respective amplitudes to different ones of the excitation electrodes.

25. The method according to claim 23, wherein coupling the control circuitry comprises applying the control voltage waveforms with different, respective duty cycles to different ones of the excitation electrodes.

26. The method according to claim 23, wherein coupling the control circuitry comprises applying the control voltage waveforms to the excitation electrodes so that the device functions as a lens, having focal properties determined by the phase modulation profile.

* * * * *